US012261404B2

(12) United States Patent
Wu

(10) Patent No.: US 12,261,404 B2
(45) Date of Patent: Mar. 25, 2025

(54) TERMINAL BLOCK WITH HANDLE STRUCTURE

(71) Applicants: DINKLE ENTERPRISE CO., LTD., New Taipei (TW); DINKLE ELECTRIC MACHINERY (CHINA) CO., LTD., Jiangsu (CN)

(72) Inventor: Shang-Tsai Wu, New Taipei (TW)

(73) Assignees: DINKLE ENTERPRISE CO., LTD., New Taipei (TW); DINKLE ELECTRIC MACHINERY (CHINA) CO., LTD., Jiangsu (CN)

( * ) Notice: Subject to any disclaimer, the term of this patent is extended or adjusted under 35 U.S.C. 154(b) by 0 days.

(21) Appl. No.: 18/227,165

(22) Filed: Jul. 27, 2023

(65) Prior Publication Data

US 2023/0369786 A1 Nov. 16, 2023

Related U.S. Application Data

(63) Continuation of application No. 17/587,208, filed on Jan. 28, 2022, now Pat. No. 11,757,214.

(51) Int. Cl.
*H01R 9/24* (2006.01)

(52) U.S. Cl.
CPC ......... *H01R 9/2416* (2013.01); *H01R 9/2408* (2013.01)

(58) Field of Classification Search
CPC ...... H01R 9/2416; H01R 9/2408; H01R 9/24; H01R 4/4836; H01R 4/4809; H01R 4/4845
See application file for complete search history.

(56) References Cited

U.S. PATENT DOCUMENTS 6,851,967 B2 * 2/2005 Miyoshi ............. H01R 4/48365 439/441
9,680,237 B2 * 6/2017 Aporius ............... H01R 13/633

FOREIGN PATENT DOCUMENTS

WO WO-2014072182 A1 * 5/2014 ........... H01R 4/4836

* cited by examiner

*Primary Examiner* — Vanessa Girardi
(74) *Attorney, Agent, or Firm* — Chun-Ming Shih; HDLS IPR SERVICES

(57) ABSTRACT

A terminal block with a handle structure includes an insulation base having an accommodation space, an insertion port, and a side opening. The insulation base has a limit column and a pivot part formed in the accommodation space. A conductive terminal includes a conductive body and plural lead pins, and the conductive body is positioned in the accommodation space, and the lead pin passes out from the insulation base. An elastic plate includes an abutting arm with a curved surface, a bend section sheathing the limit column, and the abutting arm is suspended on a side of the insertion port, and a pivot of the handle structure is combined with the pivot part to make a handle protrude from the insulation base, and a pressing cam abuts against the curved surface of the abutting arm, so that the handle structure may avoid damages and provide a labor-saving effect.

9 Claims, 8 Drawing Sheets

TERMINAL BLOCK WITH HANDLE STRUCTURE

CROSS-REFERENCE TO RELATED APPLICATION

This application is a continuing application of U.S. patent application Ser. No. 17/587,208, filed on Jan. 28, 2022, and entitled "TERMINAL BLOCK WITH HANDLE STRUCTURE." The entire disclosures of the above applications are all incorporated herein by reference.

BACKGROUND OF THE DISCLOSURE

Technical Field

The technical field relates to a terminal block, and more particularly relates to the terminal block with a handle structure.

Description of Related Art

Terminal block is an electrical connection device formed by an insulation base, an elastic plate, a conductive terminal and other components and used as a work platform for providing an electrical connection with a plurality of conductive wires. Specifically, the elastic plate and the conductive terminal are installed in the insulation base, and a screwdriver or other tools are used to press the elastic plate and plug external conductive wires into the insulation base to contact the conductive terminal, so as to achieve a wire connection effect.

However, it is inconvenient for users to use the screwdriver or other tools to press the elastic plate inside the terminal block, and thus some terminal blocks have an elastic handle provided for pressing the elastic plate inside the insulation base to assist plugging a cable for an electrical connection. Since the elastic handle is generally made of a plastic material, its structural strength is not too high, and the elastic handle may be damaged easily in a long time of use, thereby leading to high failure rate and maintenance rate of the terminal block. Obviously, the related-art terminal block requires further improvements.

In view of the aforementioned drawbacks, the inventor proposes this disclosure based on his expert knowledge and elaborate researches to overcome the drawbacks of the related art.

SUMMARY OF THE DISCLOSURE

It is a primary objective of this disclosure to provide a terminal block with a handle structure, and the handle structure may slide smoothly relative to the elastic plate and provide a labor-saving effect to avoid damages thereto.

To achieve the aforementioned objective, this disclosure discloses a terminal block with a handle structure, and the terminal block includes an insulation base, a conductive terminal, an elastic plate, and a handle structure. The insulation base has an accommodation space, an insertion port and a side opening communicating with the accommodation space, and a limit column and a pivot part formed in the accommodation space of the insulation base. The conductive terminal includes a conductive body and a plurality of lead pins, and the conductive body is positioned in the accommodation space, and the lead pin passes out from the insulation base. The elastic plate includes an abutting arm, a bend section extended from the abutting arm, and a fixed section connected to the bend section. The abutting arm has a curved surface, and the bend section sheathe a limit column, and the abutting arm is suspended on a side of the insertion port. The handle structure includes a handle, a pressing cam and a pivot, and the pivot is combined with the pivot part to make the handle protrude from the insulation base, and the pressing cam abuts against a curved surface of the abutting arm.

Compared with the related art, the handle structure of the terminal block of this disclosure includes a pressing cam, and the abutting arm of the elastic plate has a curved surface. Therefore, when an external force continuously acts and rotates the handle, the pressing cam may slide along the abutting arm and abut against the curved surface. The damping effect produced between the curved surface and the pressing cam may prevent the handle structure from being damaged by instant rebounds, so as to reduce the failure rate and maintenance rate of the terminal block. In addition, the pressing cam of this disclosure presses at a position of abutting arm proximate to the bend section, so that a free end of the abutting arm has a longer moment arm, and a labor-saving effect may be achieved. When the pressing cam is positioned at the curved surface of the elastic plate to define a self-locking state, users may perform wiring/wire-removing actions in a more coordinated, smoother, and better operation feeling manner to improve the practicality of use.

BRIEF DESCRIPTION OF THE DRAWINGS

The features of the disclosure believed to be novel are set forth with particularity in the appended claims. The disclosure itself, however, may be best understood by reference to the following detailed description of the disclosure, which describes a number of exemplary embodiments of the disclosure, taken in conjunction with the accompanying drawings, in which:

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
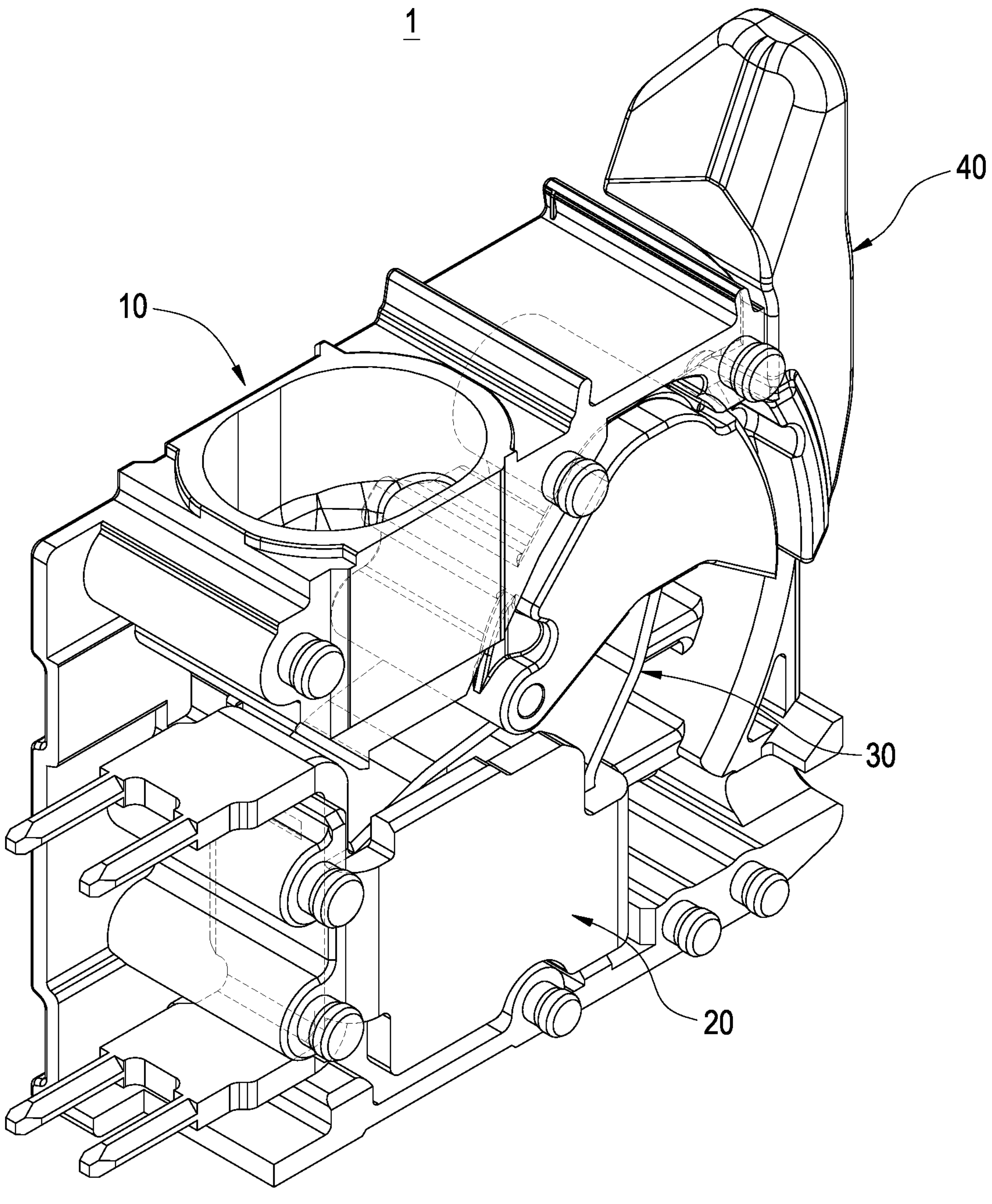
FIG. 1 is a perspective view of a terminal block with a handle structure in accordance with this disclosure.

With reference to FIG. 1 for a perspective view of a terminal block with a handle structure in accordance with this disclosure, the terminal block 1 includes an insulation base 10, a conductive terminal 20, an elastic plate 30 and a handle structure 40. The elastic plate 30 is combined with the conductive terminal 20 and installed together with the conductive terminal 20 in the insulation base 10. The handle structure 40 is installed on a side of the insulation base 10. The terminal block 1 with a handle structure 40 is described more specifically as follows.

Figure 2:
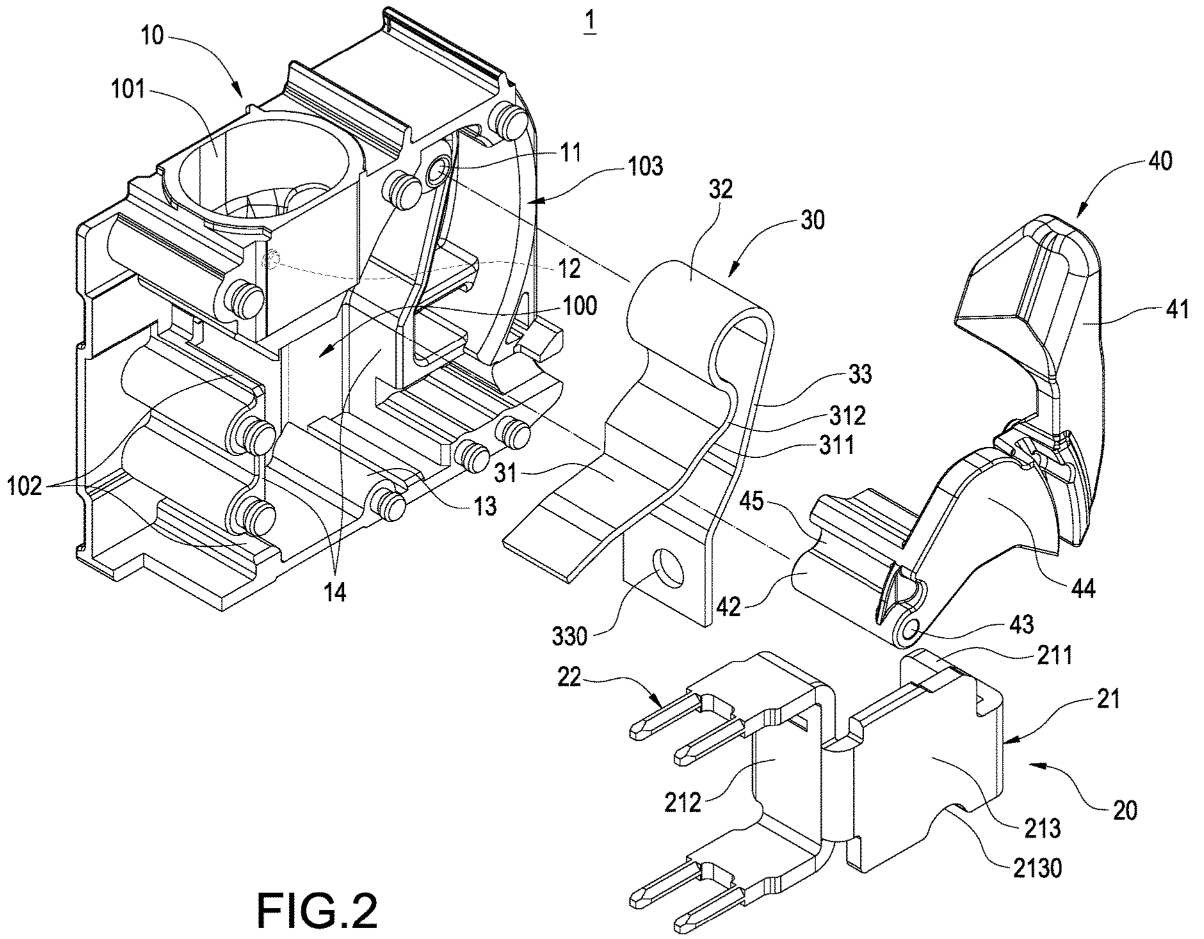
FIG. 2 is an exploded view of a terminal block with a handle structure in accordance with this disclosure.
Figure 3:
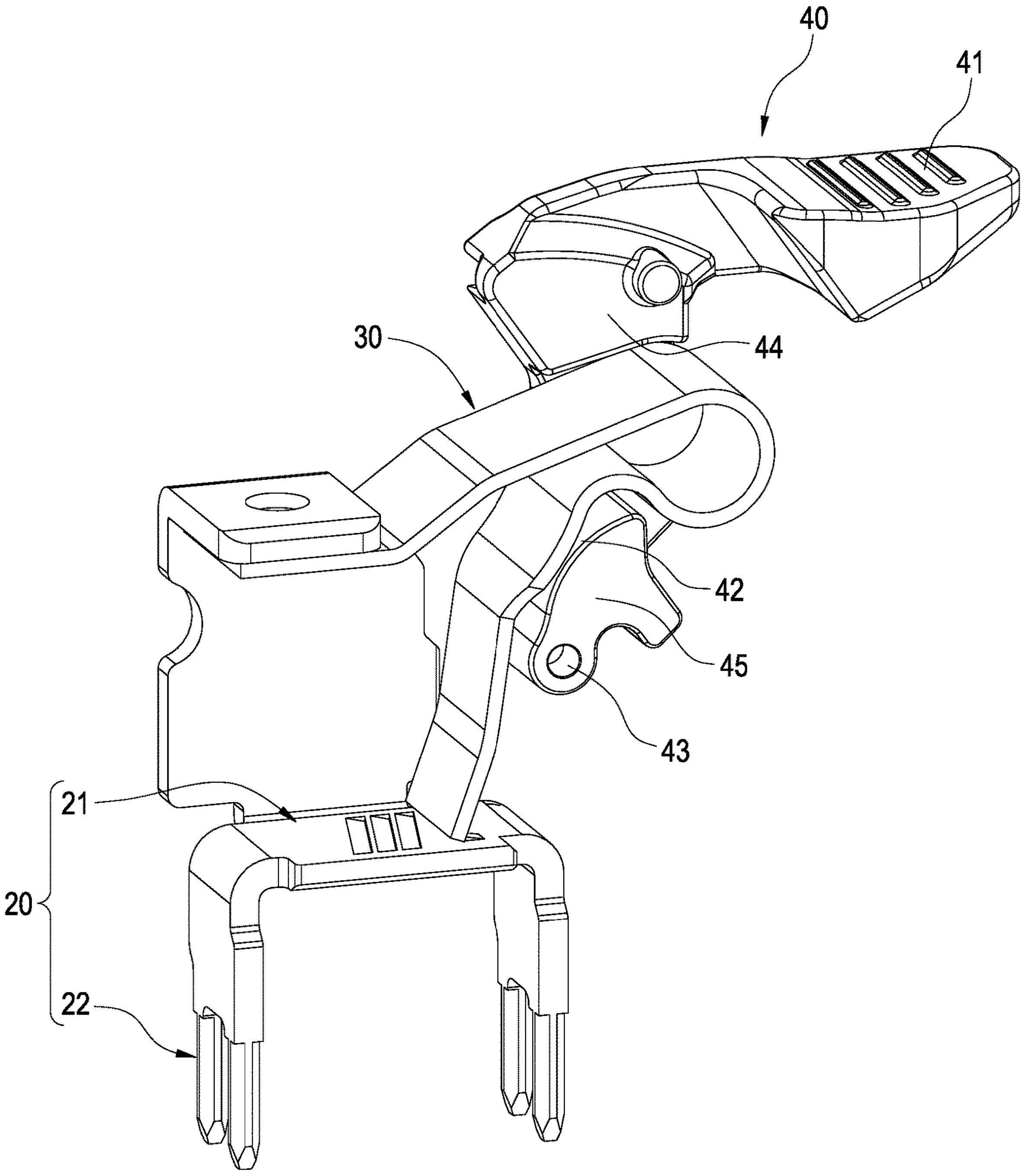
FIG. 3 is a schematic view of pressing a handle structure and an elastic plate in accordance with this disclosure.
Figure 4:
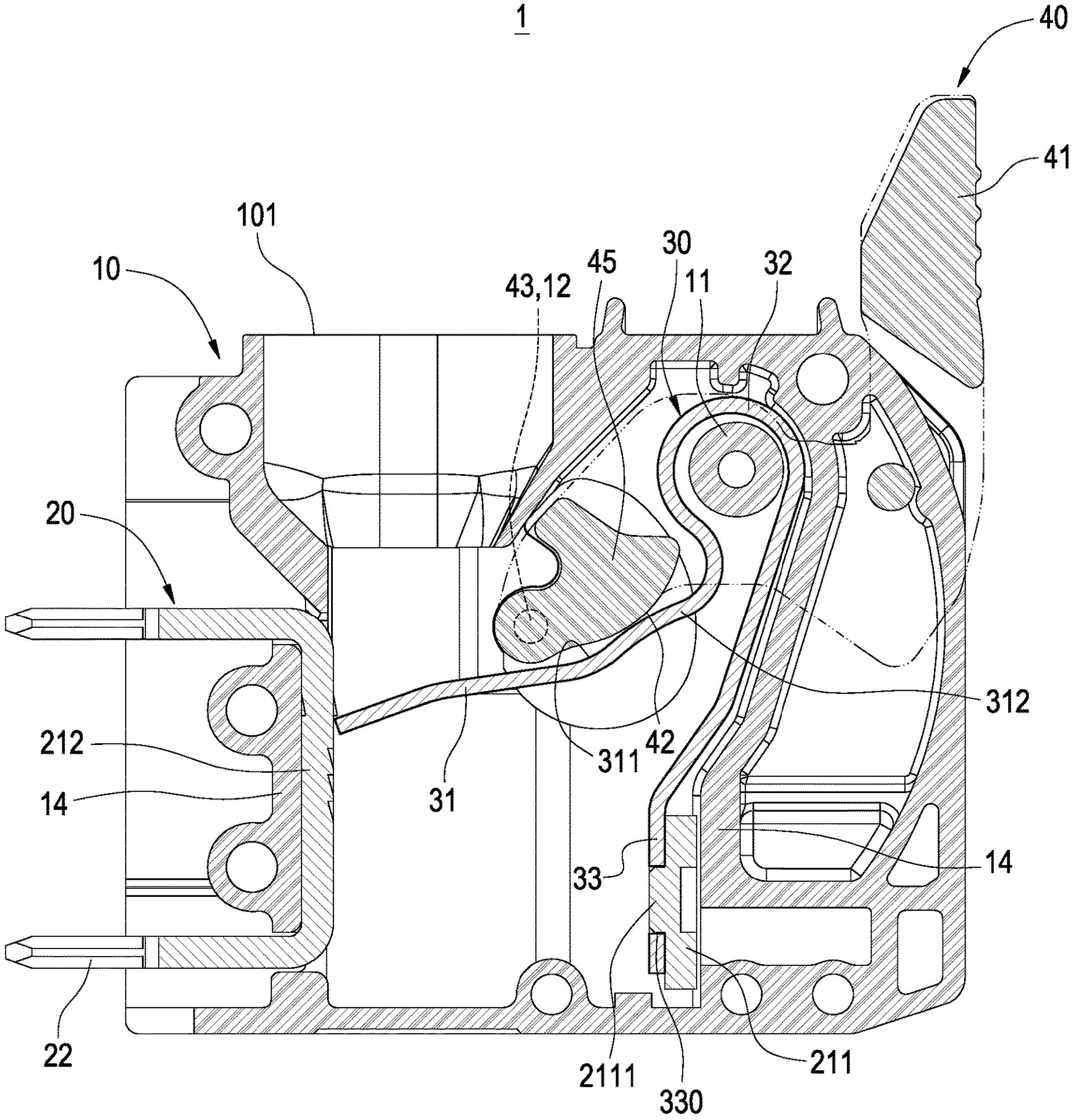
FIG. 4 is a cross-sectional view of a terminal block with a handle structure in accordance with this disclosure.

Please refer to FIGS. 2 to 4 for an exploded view of a terminal block with a handle structure of this disclosure, a schematic view of pressing a handle structure and an elastic plate, and a cross-sectional view of the terminal block with a handle structure in accordance with this disclosure respectively. FIG. 2 shows that the insulation base 10 includes an accommodation space 100, an insertion port 101 communicating with the accommodation space 100, a plurality of passing-through outlets 102 and a side opening 103. The insertion port 101 and the passing-through outlets 102 are respectively and vertically disposed on two sides of the insulation base 10. In addition, the side opening 103 is located on the other side of the insulation base 10 perpendicular to the insertion port 101.

In this embodiment, the insulation base 10 has a limit column 11, a pivot part 12 and a protruding column 13 formed in the accommodation space 100. In addition, the insulation base 10 has a pair of support walls 14 disposed corresponding to the insertion port 101 and located on the opposite sides of the accommodation space 100. It is noteworthy that the insulation base 10 has a plurality of binding columns 15 formed on a wall of the side opening 102. The binding columns 15 are provided for the positioning purpose when adjacent insulation bases 10 are combined and connected with each other.

The conductive terminal 20 includes a conductive body 21 and a plurality of lead pins 22. The conductive body 21 is positioned in the accommodation space 100, and the ends of the lead pins 22 pass out the insulation base 10 from the passing-through outlets 102. Specifically, the conductive body 21 includes a front conductive plate 211, a rear conductive plate 212 and a side conductive plate 213 connected between the front conductive plate 211 and the rear conductive plate 212.

More specifically, the rear conductive plate 212 is a U-shaped plate. The lead pins 22 are arranged in pairs and installed on opposite sides of the rear conductive plate 212 respectively. In addition, the side conductive plate 213 has an arch 2130, and the side conductive plate 213 is engaged with the protruding column 13 through the arch 2130 to be positioned at the insulation base 10.

In addition, the elastic plate 30 includes an abutting arm 31, a bend section 32 extended from the abutting arm 31 and a fixed section 33 connected to the bend section 32. The abutting arm 31 has a curved surface 311. The bend section 32 is adapted to sheathe the limit column 11 to be positioned at the insulation base 10, such that the abutting arm 31 is suspended on (under) a side of the insertion port 11. It is noteworthy that the fixed section 33 of the elastic plate 30 has a hole 330 provided for positioning the elastic plate 30.

The handle structure 40 includes a handle 41, a pressing cam 42 and a pivot 43. In this embodiment, the handle structure 40 further includes a lever plate 44 and a pressing block 45. Two ends of the lever plate 44 are connected to the handle 41 and the pressing cam 42 respectively. In addition, the pressing cam 42 and the pivot 43 are installed to a bottom edge of the pressing block 45. In some embodiments, the handle structure 40 is integrally formed (or formed in one piece) for those components to be in a connected manner.

In FIGS. 3 and 4, the conductive terminal 20 is installed in the insulation base 10, and the front conductive plate 211 and the rear conductive plate 212 abut against the pair of support walls 14 of the insulation base 10 respectively. In an embodiment of this disclosure, the front conductive plate 211 has a bump 2111. The front conductive plate 211 and the elastic plate 30 are engaged with each other through the bump 2111 and the hole 330 to be positioned.

In addition, the elastic plate 30 is positioned at the insulation base 10 through the bend section 32 sheathing the limit column 11, and the handle structure 40 is pivotally connected to the pivot part 12 through the pivot 43 to be combined with the insulation base 10, and the handle 41 protrudes from the insulation base 10.

Figure 5:
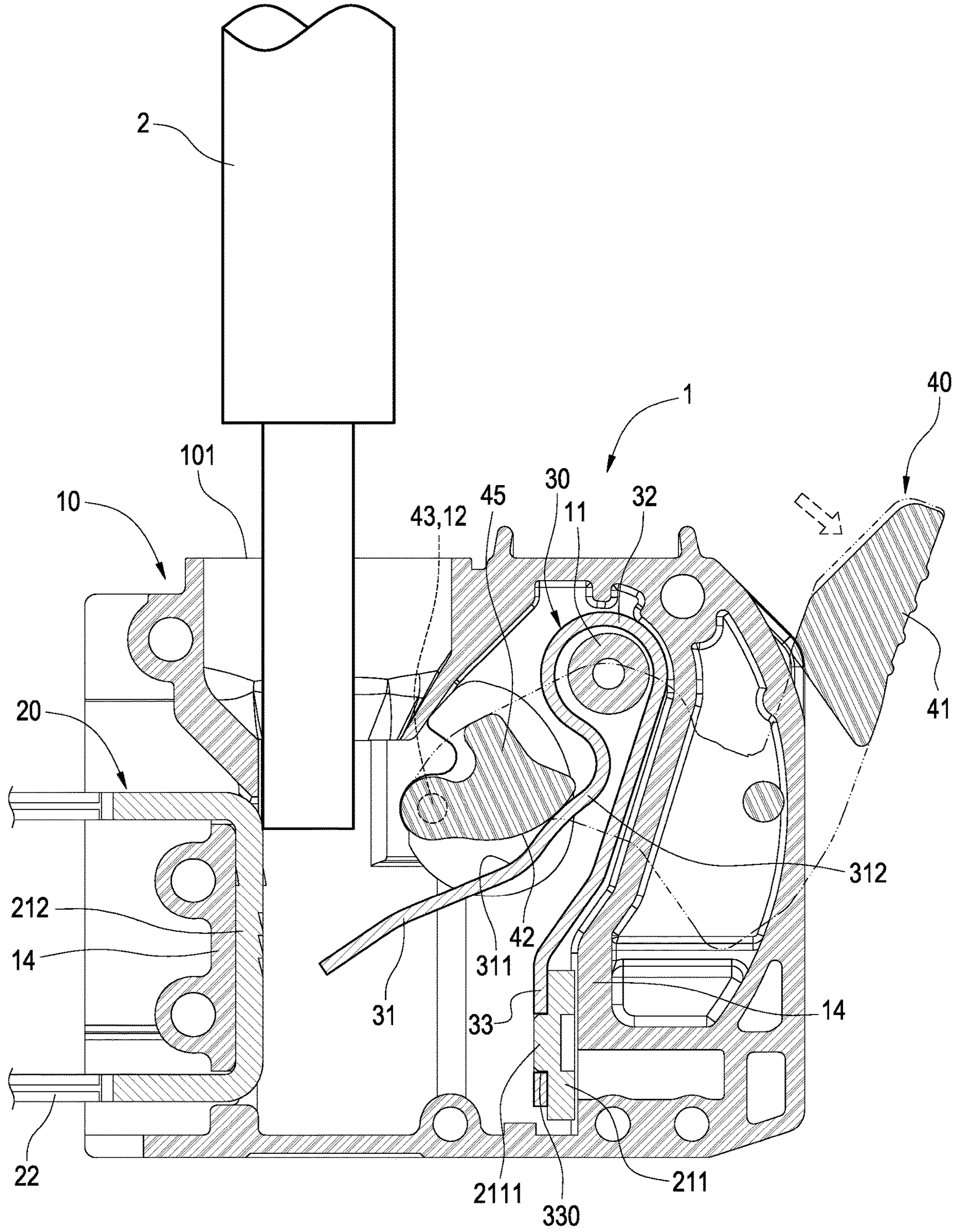
FIG. 5 is a schematic view of exerting an external force to a handle structure to plug and connect a cable in accordance with this disclosure.
Figure 6:
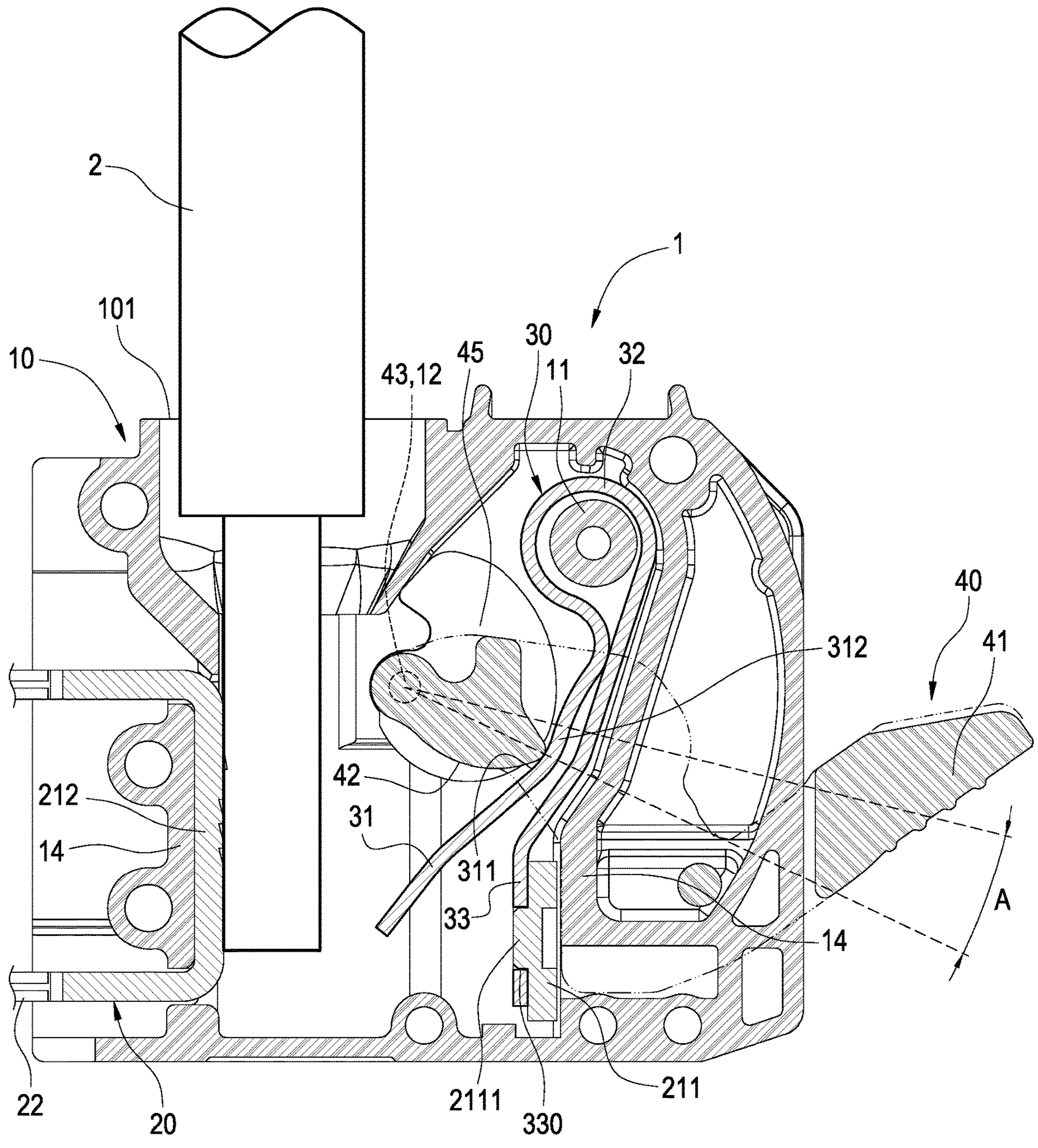
FIG. 6 is a schematic view of positioning a handle structure in accordance with this disclosure.
Figure 7:
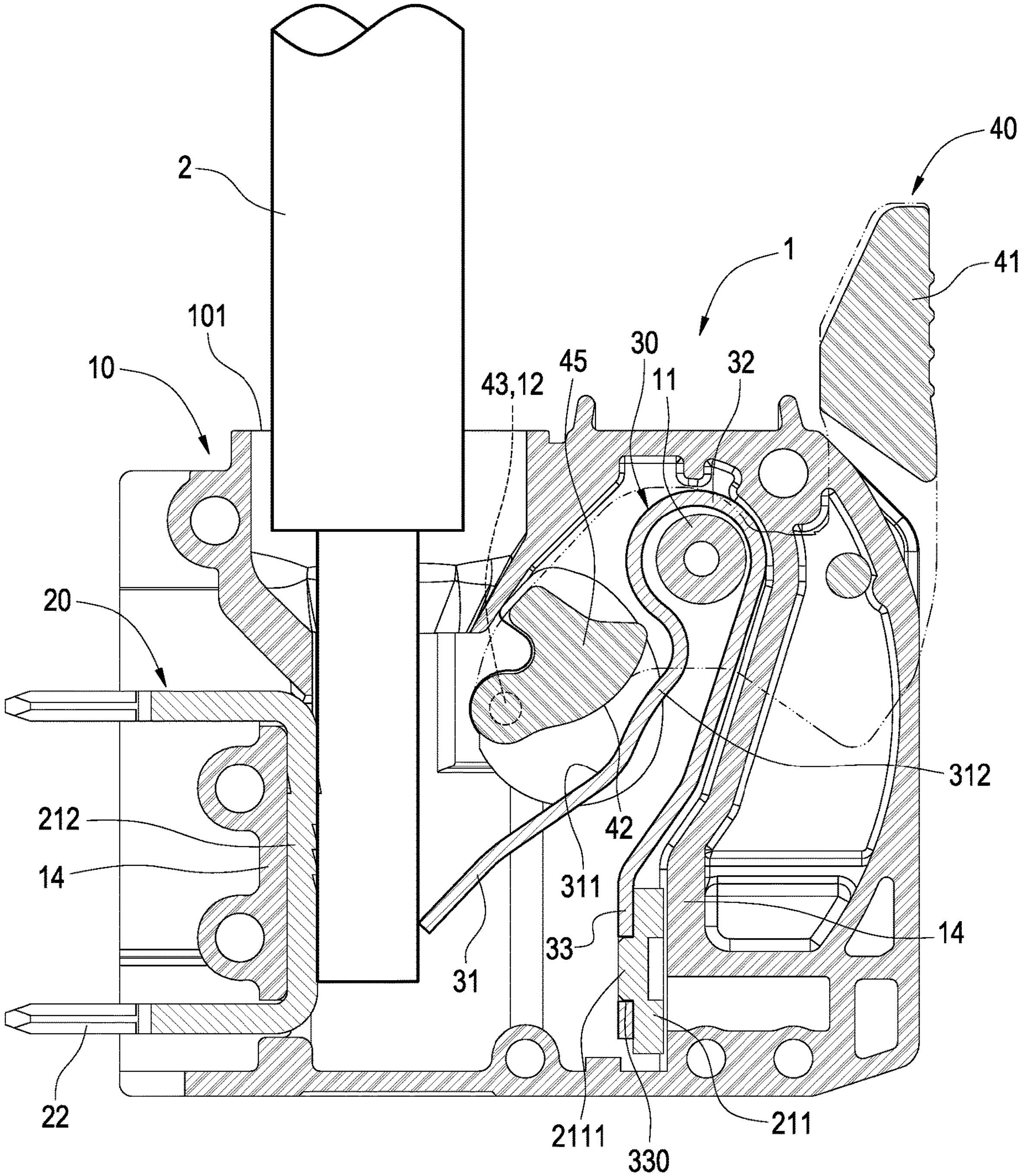
FIG. 7 is a schematic view of returning a handle structure to its original position after plugging and connecting a cable into a terminal block in accordance with this disclosure.

With reference to FIGS. 5 to 7 for a schematic view of exerting an external force to a handle structure to plug and connect a cable, a schematic view of positioning a handle structure, and a schematic view of returning a handle structure to its original position after plugging and connecting a cable into a terminal block in accordance with this disclosure respectively, the terminal block 1 with a side-pressing handle structure of this disclosure is provided for plugging at least one cable 2. In a practical application as shown in FIG. 5, an external force acts on the handle 41, such that the handle structure 40 is rotated by using the pivot 43 as a center to press the pressing cam 42 at the abutting arm 31 of the elastic plate 30.

It is noteworthy that the pressing cam 42 abuts against a position of the abutting arm 31 proximate to the bend section 32, so that a free end of the abutting arm 31 has a longer moment arm, and the elastic restoring force of the abutting arm 31 relative to the pressing cam 42 is smaller.

In addition, the relative distance between the pressing cam 42 and the pivot 43 is smaller than the relative distance between the handle 41 and the pivot 43, so that the rotational moment of the pressing cam 42 acted on the abutting arm 31 is small, thereby reducing the force acting on the handle 41 to achieve a labor-saving effect.

In FIG. 6, when the external force continuously acts on the handle 41 to drive the handle structure 40 to rotate in a direction away from the cable 2 by using the pivot 43 as the center, the pressing cam 42 may slide along the abutting arm 31 and abut against the curved surface 311.

It is noteworthy that when the pressing cam 42 is positioned at the curved surface 311, an end of the abutting arm 31 may leave the rear conductive plate 212 to facilitate inserting a cable 2 into the insulation base 10 from the insertion port 101, keeping the cable 2 to remain abutting against a side of the rear conductive plate 212 to be conductively connected with the conductive body 21. Therefore, the cable 2 is electrically connected with the conductive terminal 20.

It is noteworthy that the abutting arm 31 has an arc transition section 312 formed on a side of the curved surface 311 and facing the bend section 32. When the pressing cam 42 slides along the abutting arm 31 and passes through the arc transition section 312, the force receiving point of the pressing cam 42 acting on the abutting arm 3 passes through a self-locking transition line defined by the handle 41 and the elastic plate 30. At the same time, the handle structure 40 under the effect of the principle of eccentric lever may stop at and abut against the curved surface 311. A self-locking angle A is defined between the curved surface 311, the arc transition section 312 and the pivot 43.

In addition, a damping effect is produced between the curved surface 311 and the pressing cam 42, so that the handle structure 40 may be prevented from rebounding instantly and being damaged easily, so as to facilitate users to perform wiring/wire-removing actions, and provide a more coordinated, smooth, and better operating feeling of the operation.

In FIG. 7, after the wiring/wire-removing actions of the cable 2 are completed, the users may apply a force in an opposite direction to the handle 41 to detach the pressing cam 42 from the curved surface 311 and press the abutting arm 31. At the same time, an end of the abutting arm 31 may abut against the cable 2 due to the elastic restoring force of the elastic plate 30. Therefore, the cable 2 is clamped by the elastic plate 30 and positioned in the insulation base 10. On the other hand, the pressing cam 42 may slide in the opposite direction along the abutting arm 31 and smoothly pass through the curved surface 311 and the arc transition section 312, so that the handle structure 40 returns to its original state.

Figure 8:
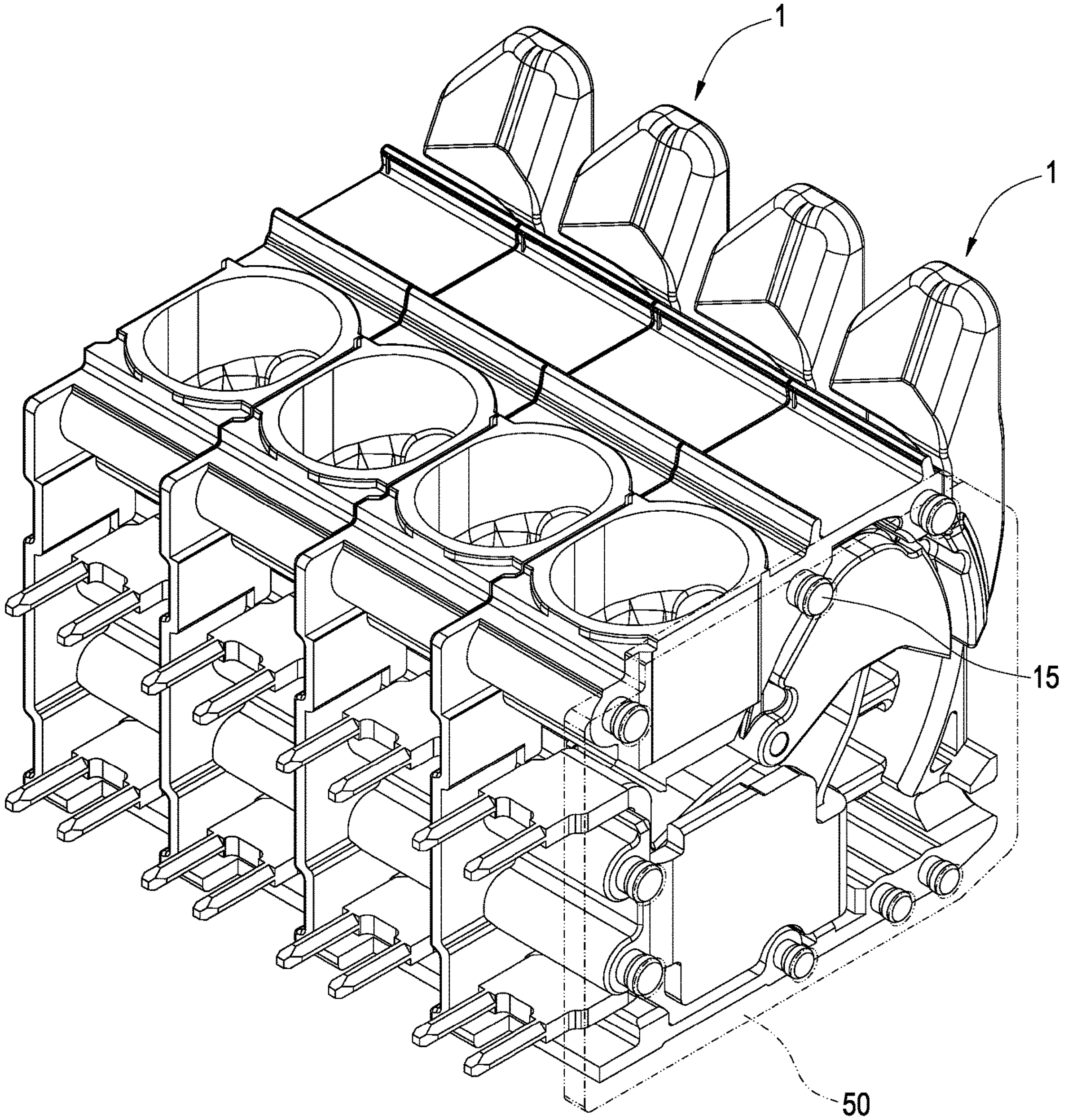
FIG. 8 is a perspective view of a terminal block with a handle structure in accordance with another implementation mode of this disclosure.

With reference to FIG. 8 for another implementation mode of a terminal block with a handle structure in accordance with an embodiment of this disclosure, the quantity of the insulation bases 10 may be multiple, and the insulation bases 10 respectively include the conductive terminal 20, elastic plate 30 and handle structure 40. The lateral side of each insulation base 10 has a plurality of binding columns 15. The adjacent insulation bases 10 are combined and connected to one another by the binding columns 15, so as to achieve the effect of plugging a plurality of cables.

It is noteworthy that the terminal block 1 with a handle structure of this disclosure may further include a cover plate 50 covering a side of the insulation base 10 to prevent internal components from being exposed to the outside.

While this disclosure has been described by means of specific embodiments, numerous modifications and variations could be made thereto by those skilled in the art without departing from the scope and spirit of this disclosure set forth in the claims.

What is claimed is:

1. A terminal block, comprising:

an insulation base, comprising an accommodation space, an insertion port and a side opening communicating with the accommodation space, and a limit column and a pivot part disposed in the accommodation space of the insulation base;

a conductive terminal, comprising a conductive body and a plurality of lead pins, and the conductive body positioned in the accommodation space, and the lead pins passing out from the insulation base;

an elastic plate, comprising an abutting arm, a bend section extended from the abutting arm, and a fixed section coupled to the bend section, and the abutting arm comprising a curved surface, and the abutting arm suspended on a side of the insertion port, wherein the limit column is located within the bend section, and the pivot part is located out of the bend section; and a handle structure, comprising a handle, a pressing cam and a pivot, and the pivot being combined with the pivot part to make the handle protrude from the insulation base, and the pressing cam abutting against a curved surface of the abutting arm;

wherein the handle structure comprises a pressing block disposed thereon, and the pressing cam and the pivot are disposed on a bottom edge of the pressing block, and the pivot is located below the insertion port and adjacent to the curved surface of the abutting arm, and the pivot is located between an outer side of the elastic plate and the insertion port.

2. The terminal block according to claim 1, wherein the insulation base is multiple in number, and each insulation base comprises a plurality of binding columns disposed on a wall of the side opening, and the insulation bases adjacent to each other are coupled through the binding columns.

3. The terminal block according to claim 1, wherein the abutting arm comprises an arc transition section disposed on a side of the curved surface and facing the bend section.

4. The terminal block according to claim 1, wherein the handle structure further comprises a lever plate with two ends coupled to the handle and the pressing cam respectively.

5. The terminal block according to claim 1, wherein a relative distance between the pressing cam and the pivot is smaller than a relative distance between the handle and the pivot.

6. The terminal block according to claim 1, wherein the insulation base comprises a pair of support walls disposed corresponding to the insertion port and located on opposite sides of the accommodation space.

7. The terminal block according to claim 6, wherein the conductive body comprises a front conductive plate, a rear conductive plate and a side conductive plate coupled between the front conductive plate and the rear conductive plate, and the front conductive plate and the rear conductive plate abut against the pair of support walls respectively.

8. The terminal block according to claim 7, wherein the insulation base comprises a protruding column disposed thereon, and the side conductive plate comprises an arch positioned on the protruding column.

9. The terminal block according to claim 7, wherein the front conductive plate comprises a bump, and the fixed section of the elastic plate comprises a hole, and the front conductive plate and the elastic plate are engaged with each other through the bump and the hole to be positioned, the rear conductive plate is a U-shaped plate, and the lead pins are paired and installed on opposite sides of the rear conductive plate respectively.

* * * * *